United States Patent [19]
Nercissiantz et al.

[11] Patent Number: 5,696,072
[45] Date of Patent: Dec. 9, 1997

[54] PSEUDOPLASTIC, SHEAR THINNED PAINT STRIPPER

[75] Inventors: Ara Z. Nercissiantz, Tujunga; Harvey Hans, Fountain Valley, both of Calif.

[73] Assignee: McGean-Rohco, Inc., Cleveland, Ohio

[21] Appl. No.: 530,520

[22] Filed: Sep. 19, 1995

[51] Int. Cl.⁶ .............................. C09D 9/00; C09D 9/04
[52] U.S. Cl. .................. 510/206; 510/202; 510/212; 510/471; 510/507; 510/207
[58] Field of Search .......................... 510/201, 202, 510/203, 206, 212, 403, 405, 471, 507

[56] References Cited

U.S. PATENT DOCUMENTS

| | | | |
|---|---|---|---|
| 4,643,840 | 2/1987 | Brocklehurst et al. | 252/160 |
| 4,836,950 | 6/1989 | Madsen et al. | 252/153 |
| 5,124,062 | 6/1992 | Stevens | 252/162 |
| 5,411,678 | 5/1995 | Sim | 252/548 |
| 5,425,893 | 6/1995 | Stevens | 252/166 |

FOREIGN PATENT DOCUMENTS

497130B1  8/1992  European Pat. Off.

*Primary Examiner*—Margaret Einsmann
*Attorney, Agent, or Firm*—Renner, Otto, Boisselle & Sklar

[57] ABSTRACT

A paint-stripper composition is described which comprises a mixture of (A) from about 5% to about 90% by weight of at least one organic solvent selected from the group consisting of benzyl alcohol, alkyl-substituted benzyl alcohols, furfuryl alcohol, alkyl-substituted furfuryl alcohol and acetylenic alcohols containing from 3 to about 5 carbon atoms;

(B) from about 0.05% to about 5% by weight of at least one inorganic clay thickener;

(C) from about 0.05% to about 5% by weight of at least one organic thickener; and (D) up to about 94.9% by weight of water.

A method of stripping paint from a surface also is described, and the method comprises (A) contacting the paint with a paint stripper composition as described above; for a period of time sufficient to reduce the adhesion of the paint to the surface; and (B) removing said paint and paint-stripper composition from said surface.

37 Claims, No Drawings

PSEUDOPLASTIC, SHEAR THINNED PAINT STRIPPER

TECHNICAL FIELD OF THE INVENTION

This invention relates to paint strippers and to methods of stripping paint from surfaces. More particularly, the invention relates to pseudoplastic paint strippers with improved rheological properties.

BACKGROUND OF THE INVENTION

The terms "paint stripper" and "paint remover" as used in this application refer to chemical compositions which can strip or facilitate stripping of coatings such as paint which are used to protect and beautify substrates. With the introduction of new and more durable types of synthetic resins and polymers in protective and decorative coatings, the problem of stripping the coating has become increasingly difficult. Prior art paint removers and strippers typically contain blends of aromatic solvents, ketones, paraffin, methanol and diluents, for example, mineral spirits. Traditional paint strippers have contained hazardous materials such as phenol, toluene and methylethyl ketone, and the most effective paint strippers were based on methylene chloride as the primary solvent. Methylene chloride is a very effective solvent, and paint strippers containing methylene chloride are effective for quickly softening most types of paints. Methylene chloride, however, is a highly volatile liquid thereby shortening the work life. In addition, methylene chloride has been discovered to cause tumors and cancer in animals in laboratory tests and, accordingly, attempts are being made in the industry and by governmental regulatory agencies to eliminate or greatly reduce its use.

A number of paint removers and paint strippers have been introduced in recent years which avoid the use of methylene chloride and flammable, volatile and toxic chemicals such as benzene, toluene, phenol, and acetone. N-methyl-2-pyrrolidone (NMP) has been employed in place of methylene chloride as a solvent ingredient in paint-stripper compositions as suggested in several patents. U.S. Pat. No. 4,749,510, for example, describes a paint-stripper having a low volatility which includes about 20% to 90% by weight of NMP and 30% to 70% by weight of an aromatic hydrocarbon solvent. U.S. Pat. No. 4,836,950 describes liquid formulations for removing screen printing inks which comprises a mixture of NMP and gammabutyrolactone.

U.S. Pat. No. 5,124,062 describes paint-stripper compositions having high flash points and low-boiling volatile organic chemicals which comprise a mixture of a terpene compound containing at least 10 carbon atoms, NMP and a terpene emulsifying surfactant.

Recently, non-hazardous products for removing paint have been introduced which incorporate the use of benzyl alcohol as a principal solvent. The performance of benzyl alcohol-based strippers is improved when activated with an acid, but such stripping agents may deleteriously affect high strength steel which is used, for example, in aircraft landing gear parts. Benzyl alcohol-based strippers also have been available which contain an alkaline component rather than an acid for activation. U.S. Pat. No. 5,411,678 (Sims) describes paint strippers comprising an organic solvent such as a benzyl alcohol, pyrrole, at least one other organic amine compound as an activator, and water. EP Patent 497,130 B1 describes paint-stripper formulations containing a solvent system comprising an ester of a benzyl or methyl benzyl alcohol. In particular, the formulations comprise benzyl alcohol/benzyl formate/formic acid.

Paint-strippers and paint removers are utilized in the aerospace industry for removing paints from commercial and military jet aircraft. Periodic paint removal is required for aesthetic reasons, for a change of colors, or more importantly, for inspection of the air frame as required for safe operation of an aircraft.

SUMMARY OF THE INVENTION

A paint-stripper composition is described which comprises a mixture of
(A) from about 5% to about 90% by weight of at least one organic solvent selected from the group consisting of benzyl alcohol, alkyl-substituted benzyl alcohols, furfuryl alcohol, alkyl-substituted furfuryl alcohol and acetylenic alcohols containing from 3 to about 5 carbon atoms;
(B) from about 0.05% to about 5% by weight of at least one inorganic clay thickener;
(C) from about 0.05% to about 5% by weight of at least one organic thickener; and
(D) up to about 94.9% by weight of water.
A method of stripping paint from a surface also is described, and the method comprises
(A) contacting the paint with a paint stripper composition which comprises
  (A-1) from about 5% to 90% by weight of at least one organic solvent selected from the group consisting of benzyl alcohol alkyl-substituted benzyl alcohols, furfuryl alcohol, alkyl-substituted furfuryl alcohol and acetylenic alcohols containing from 3 to about 5 carbon atoms;
  (A-2) from about 0.05% to about 5% by weight of at least one inorganic clay thickener;
  (A-3) from about 0.05% to about 5% by weight of at least one organic thickener; and
  (A-4) up to about 94.9% by weight of water.
for a period of time sufficient to reduce the adhesion of the paint to the surface; and
(B) removing said paint and paint-stripper composition from said surface.

DESCRIPTION OF THE PREFERRED EMBODIMENTS

One essential component of the paint-stripper compositions of the present invention is (A) at least one organic solvent which is selected from the group consisting of benzyl alcohol, alkyl-substituted benzyl alcohols, furfuryl alcohol, alkyl-substituted furfuryl alcohol and acetylenic alcohols containing from 3 to about 5 carbon atoms. The amount of the organic solvent (A) incorporated into the paint-stripper compositions of the present invention is at least about 5% by weight. Generally, the compositions will contain from about 5% to about 94.9% by weight of the organic solvent (A), and more often, from about 20% to about 80% by weight, and in some circumstances from about 25% to about 50% by weight.

Any of the alkyl-substituted benzyl alcohols may be utilized, and the alkyl groups generally contain from 1 to about 4 carbon atoms. Specific examples of the alkyl-substituted benzyl alcohols include: alpha-methylbenzyl alcohol, alpha-ethylbenzyl alcohol, ortho-methylbenzyl alcohol, meta-methylbenzyl alcohol, para-methylbenzyl alcohol, ortho-ethylbenzyl alcohol, para-ethylbenzyl alcohol, para-propylbenzyl alcohol, para-n-butylbenzyl alcohol and para-t-butylbenzyl alcohol.

The alkyl group in the alkyl-substituted furfuryl alcohols may contain from 1 to 4 carbon atoms. Examples of substituted furfuryl alcohols include alpha-methylfurfuryl alcohol, alpha-ethylfurfuryl alcohol, 5-methylfurfuryl alcohol, etc.

The acetylenic alcohols which may be utilized as the organic solvent in these paint-striper compositions of the present invention contain from about 3 to about 5 carbon atoms, and the acetylenic alcohols may be primary or secondary alcohols. Primary alcohols are preferred. Examples of acetylenic alcohols which may be used in the present invention include propargyl alcohol, 2-butyn-1-ol, 3-butyn-1-ol, 3-butyn-2-ol, 1-pentyn-3-ol, 2-pentyn-1-ol, 3-pentyn-1-ol, 4-pentyn-1-ol.

In one preferred embodiment, the organic solvents (A) utilized in the present invention are those containing a primary hydroxyl group, that is, a —$CH_2OH$ group. That is, in a preferred embodiment of the invention the organic solvents are selected from a group consisting of benzyl alcohol, ring-substituted alkylbenzyl alcohols, furfuryl alcohol, furfuryl alcohols which contain an alkyl substituent on the ring, and those acetylenic alcohols wherein the hydroxyl group is on a terminal methylene group such as propargyl alcohol, 2-butyn-1-ol, 3-butyn-1-ol, 2-pentyn-1-ol, 3-pentyn1-ol and 4-pentyn-1-ol.

Another essential component of the paint-stripper compositions of the present invention is (B) at least one inorganic clay thickener. A variety of inorganic clay thickeners including modified natural clays are available and useful in the paint-stripping compositions of the present invention. Examples of inorganic clays which can be utilized either in their natural form or in modified form include smectite clays, montmorillonite clays, hectorite clays, bentonite clays, etc. Smectite clays are particularly useful in the paint-stripping compositions of the present invention. Colloidal or hydrated magnesium aluminum silicate is an example of a specific type of treated smectite clay which is useful in the present invention. Such colloidal or hydrated magnesium aluminum silicates are available commercially from, for example, R.T. Vanderbilt Co., Inc. under the trade designations Veegum and Van Gel. Magnesium aluminum silicate also is available from Rheox, Inc. under the trade designation Bentone MA. Montmorillonite clay thickeners also are available commercially. For example, organically modified montmorillonite clays are available from Rheox, Inc. under the general trade designations Baragel 3000, Bentone SD, Bentone 27, Bentone 34, Bentone 760, Bentone 2282, etc. Hectorite clays are available commercially from, for example, Southern Clay Products under the general trade designation Laponite, and from Rheox, Inc. under the designation Bentone LT. Bentonite clays are available from American Colloid Company under the general trade designation Polargel.

The amount of inorganic clay thickener utilized in the paint-stripping compositions of the present invention generally will be in the range of from about 0.05 to about 5% by weight. More often, the amount of the inorganic clay thickener present in the paint-stripping composition will be in the range of from about 0.1 to about 1.5% by weight based on the total weight of the paint-stripping composition.

The paint-stripping compositions of the present invention also contain one or more organic thickeners which, when combined with the inorganic clay thickener, provide paint-stripping compositions of the present invention with unique rheological properties. The organic thickeners may be polysaccharides, synthetic thickening polymers, or mixtures of two or more of these. Polysaccharide gums are high molecular weight molecules, usually with colloidal properties, which, in an appropriate solvent or swelling agent, produce gels or highly viscous suspensions or solutions at low gum concentrations. Among the polysaccharide gums that are useful are natural gums such as those disclosed in *Industrial Gums, Polysaccharides And Their Derivatives*, R. L. Whistler and J. N. BeMiller, editors, third edition, Academic Press Inc (1995). The disclosures in this book relating to water-soluble polysaccharide gums is hereby incorporated by reference. Specific examples of such polysaccharide gums include gum agar, guar gum, gum arabic, algin, dextrans, xanthan gum, methyl cellulose and its derivatives, hydroxyalkyl and alkyl ethers of cellulose, etc. Polysaccharides produced by microorganisms are particularly useful polysaccharide gums. Dextran gums and xanthan gums are examples of commercially produced microbial polysaccharides, and xanthan is a particularly preferred example of a polysaccharide gum useful in the paint-stripping compositions of the present invention. An example of commercially available xanthan gums which are useful in the compositions of the invention include Rodopol 23 and Rhodigel from R.T. Vanderbilt Co. Inc.; and Keltrol, Keltrol BT, Keltrol RD, Keltrol SF, Kelzan, Kelzan D35, Kelzan S, etc. available from the Kelco Division of Merk & Co. Inc.

Xanthan gum is a particularly preferred polysaccharide gum thickener which may be used either alone or in combination with other thickeners such as cellulose ethers and esters, including alkyl celluloses such as methyl cellulose and hydroxyalkyl celluloses such as hydroxyethyl cellulose, hydroxypropyl cellulose, etc. Examples of commercial cellulosic ethers which are useful in the present invention either alone or in combination with other polysaccharides such as xanthan gum include hydroxyethyl cellulose available from Hercules Inc. under the general trade designations Natrosol 250 ER, 250 HB, 250 HR, etc. Methylcellulose products are available commercially under a variety of designations such as Methocel, etc.

The organic thickeners which may be utilized in the present invention can also be synthetic thickening polymers. Many such polymers are known to those skilled in the art, and representative examples of synthetic thickening polymers include polyacrylates, polyacrylamides, hydrolyzed vinyl esters, water-soluble homo- and interpolymers of acryl-amidoalkane sulfonates, poly N-vinyl pyrrolidones, homo- and copolymers as well as water soluble salts of styrene, maleic anhydride and isobutylene maleic anhydride copolymers. The commercially available organic thickener useful in the present invention is a soy bean oil alkanolamide available under the trade designation Mazamide SS10 from PPG Industries. Mazamide 65 (PPG Industries) is an organic thickener which comprises mixed fatty acid diethanol amine.

The amount of organic thickener included in the paint-stripping compositions of the present invention may range from about 0.05 to about 5% by weight. More often, the amount of such thickener included in the paint-stripping compositions will be in a range of 0.1 to about 1 or 2% by weight based on the total weight of the paint-stripping composition.

The relative amounts of the inorganic clay and organic thickener such as polysaccharide gums included in the paint stripping compositions of the invention can be varied and adjusted to provide the particular rheological properties desired. More particularly, the relative amount of the inorganic clay and the polysaccharide gum present in the paint-stripper composition can be adjusted to provide a composition having the desired pseudoplastic characteristics.

A fourth essential component of the paint-stripping compositions of the present invention is water. Generally the composition will contain at least about 5% by weight and as much as 94.9% by weight of water. In other embodiments, the composition may contain at least 20% by weight of water and, in some instances, at least 25% or 40% by weight of water.

In one preferred embodiment, the paint-stripping compositions of the present invention comprise a mixture of (A) from about 5% to about 90% by weight of at least one organic solvent selected from the group consisting of benzyl alcohol and alkyl-substituted benzyl alcohols;

(B) from about 0.05% to about 5% by weight of at least one inorganic clay thickener;

(C) from about 0.05% to about 5% by weight of at least one organic thickener; and (D) up to about 94.9% by weight of water.

In another embodiment, the paint-stripping compositions of the present invention comprise a mixture of (A) from about 25% to 50% by weight of at least one organic solvent selected from the group consisting of benzyl alcohol or an alkyl-substituted benzyl alcohol containing from 1 to about 4 carbon atoms in the alkyl group;

(B) from about 0.1% to about 1.5% by weight of a hydrated magnesium aluminum silicate mineral;

(C) from about 0.1% to about 0.5% by weight of a xanthan gum;

(D) from about 0.1% to about 1% by weight of a cellulose ether or ester; and (E) up to about 74.7% by weight of water.

Other components may be included in the paint-stripping compositions of the present invention to provide additional desired properties. Examples of such optional components include surfactants, activators, alkalinity agents, inhibitors, wetting agents and antioxidants, etc.

Various surfactants can be incorporated into the paint-stripping compositions to increase the wetting characteristics of the compositions, and the surfactants may be anionic, nonionic, cationic or amphoteric surfactants or mixtures thereof. In one embodiment, the surfactants may be nonionic surfactants such as, for example, acetylenic polyols such as tetrameth-yldecynediol (Surfynol 104 or 104A, Air Products Inc.), aryloxyalkanols such as phenoxyethanol, phenoxyglycol, etc.

In one preferred embodiment, the surfactants are fluorinated nonionic, cationic or anionic surfactants. Fluorinated nonionic surfactants include fluorinated alkyl polyoxyethylene ethanols, fluorinated alkyl alkoxylates and fluorinated alkyl esters. Examples of fluorinated cationic surfactants include fluorinated alkyl quaternary ammonium halides such as iodides, etc. Useful fluorine-containing surfactants are available commercially from the 3M Company under the general trade designation Fluorad FC and from EI DuPont deNemours under the general trade designation Zonyl FS. Specific examples of such surfactants include Fluorad FC-135 which is a fluorinated alkyl quaternary ammonium iodide, Fluorad FC-170-C which is a fluorinated alkyl polyoxyethylene ethanol, Fluorad FC-171 which is a fluorinated alkyl alkoxylate, and Fluorad FC-430, FC-431 and FC-740 which are fluorinated alkyl esters. Specific examples of fluoro chemical surfactants available from DuPont include Zonyl FSN, Zonyl FSN-90, Zonyl FSO and Zonyl FSO-100 which are nonionic surfactants. In one preferred embodiment, the surfactants utilized in the present invention of the non-ionic fluorinated alkyl alkoxylates. Anionic surfactants also may be included in the paint-stripping compositions. One example of a useful anionic surfactant is Triton DF-20 which is a modified ethoxylate from Union Carbide. Typically, the surfactants, when present in the paint-stripping compositions of the invention, are utilized in amounts varying from about 0.001 to about 1 or 2% by weight.

Amine activators may also be included in the paint-stripping compositions of the invention, and such activators include ammonia, ammonium hydroxide or at least one organic amine compound. The amount of the activator present in the paint-stripping compositions may range from about 0% to about 5 or 10% by weight based on the total weight of the paint-stripping composition. In one embodiment, the paint-stripping compositions will contain from about 0.1 to about 1 or 1.5% by weight of ammonia, ammonium hydroxide or an organic amine or mixtures thereof.

A wide variety of organic amine compounds can be included as activators in the paint-stripper compositions of the invention. In one embodiment, the amines which may be used in the paint-stripper compositions of the present invention include one or more amines from the group of pyrrole, aliphatic amines, cycloaliphatic amines and heterocyclic amines. In another embodiment, the amines are primary aliphatic amines or aliphatic oximes containing at least 2 carbon atoms. In yet another embodiment, the aliphatic amines comprise oxyalkyl amines, hydroxyl amines and/or diamines.

Examples of aliphatic and cycloaliphatic primary amines useful in the present invention include ethylamine, propylamine, isopropylamine, butylamine, amylamine, furfurylamine and cyclohexylamine. The amines may be secondary amines such as dimethylamine, diethylamine, methylpropylamine, etc., or tertiary amines such as triethylamine.

Hydroxylamines are also useful in the present invention and specific examples of such amines include: ethanolamine; 3-amino-1-propanol; 2-amino-2-methyl-1-propanol; 2-amino-2-ethyl-1,3-propanediol; tris(hydroxy-methyl)-amino methane; N-methyl ethanolamine; 2-diethyl-amino-2-methyl-1-propanol. Alkoxylated amines (oxyalkylamines) also can be used in the present invention and these may be represented by 2-methoxyethylamine; 3-methoxypropylamine; 2-ethoxyethylamine; 3-ethoxypropylamine; etc.

Diamines are also useful, and the diamines may contain hydroxy groups. Examples of useful diamines include aliphatic diamines such as ethylenediamine, 1,3-diaminopropane, 1,2-diaminopropane, 1,4-diaminobutane, 1,6-diaminohexane, 3-dimethyl-aminopropylamine, aminoethyl ethanolamine, etc.

In another embodiment, the amine may be an aliphatic oxime containing at least 2 carbon atoms such as acetaldehyde oxime, acetone oxime, butanone oxime, methylethylketoxime, diethylketoxime, etc. Mixtures of hydroxyamines and oximes are particularly useful when it is desired to reduce corrosion.

In addition to the aliphatic mines, heterocyclic amines may be utilized. These include, for example, piperazine and its derivatives, piperidine and its derivatives, morpholine and its derivatives, etc. Specific examples of such heterocyclic compound include morpholine, 4-methyl morpholine and N-aminopropyl morpholine; piperazine, 1-methyl piperazine, 2-methyl-piperazine and N-aminoethyl piperazine; piperidine, 4-aminomethyl-piperidine, 2-methyl-piperidine, 3-methylpiperidine, 4-methyl-piperidine, etc.

Alkalinity agents also can be incorporated into the paint-stripping compositions of the present invention in applications to neutralize the acidity contributed by some components such as inhibitors, thickeners, surfactants, etc. Examples of useful alkalinity agents include alkali metal hydroxides such as sodium hydroxide, alkoxides and silicates such as sodium silicate, sodium methoxide, potassium methoxide, sodium ethoxide, etc. The amount of alkalinity agent included in the paint-stripping compositions of the present invention may range from about 0.1% to about 1 or 2% by weight. The amount of alkalinity agent included in any particular paint-stripping composition will depend on the amount of the acid-contributing component(s) present in the composition.

Various inhibitors also can be incorporated into the paint-stripping compositions of the invention, generally, in combination with certain surfactants. Examples of corrosion inhibitors include triazoles such as benzotriazoles, and silicates such as sodium silicate. The benzotriazoles include benzotriazole and substituted benzotriazoles. Examples of suitable compounds are benzotriazole, alkyl-substituted benzotriazole (e.g., tolyltriazole,ethylbenzotriazole, hexylbenzotriazole,octylbenzotriazoles,etc.) aryl-substituted benzotriazole (e.g., phenylbenzotriazoles, etc.), an alkaryl- or arylalk-substituted benzotriazole, and substituted benzotriazoles wherein the substituents may be, for example, hydroxy, mercapto, alkoxy, halo (especially chloro), nitro, carboxy or carbalkoxy. Preferred are benzotriazole, the alkylbenzotriazoles in which the alkyl group contains 1 to about 20 carbon atoms and especially 1 to about 8 carbon atoms, most desirably benzotriazole and tolyltriazole, and carboxy substituted benzotriazole.

Ethers of acetylenic diols are also useful corrosion inhibitors which may be included in the paint-stripping compositions of the invention. One example of a useful ether compound comprises a mixture of hydroxy-ethyl ethers of butynediol available from International Specialty Products under the trade designation Butoxyne 497. A combination of tolyltriazole and mercaptobenzotriazole has been found to be particularly effective in the compositions of the invention. A useful carboxy benzotriazole mixture is available under the designation Cobralec CBT from PMC Specialties Group Inc. of PMC Inc. Benzotriazole and substituted benzotriazoles are available from Ceba-Geigy Corp. under the general trade designation Rheomet. Only small amounts of the inhibitors are generally needed and such amounts range from about 0.01 to about 3% or 5% by weight.

Wetting agents also can be included in the paint-stripping compositions. For example, the inclusion of glycerine improves the consistency of the composition and the ability of the paint-stripping composition to wet the paint surface. The amount of wetting agent can range from 0 to about 4 or 5% by weight.

The paint-stripping compositions of the present invention are characterized as pseudoplastic, shear thinned compositions with improved rheological properties. The compositions can be prepared having relatively low viscosity while exhibiting desirable thixotropic characteristics. The paint stripper compositions of the invention have a high ability to cling to painted surfaces and penetrate the paint.

The paint-stripping compositions of the present invention are aqueous emulsions which generally are prepared by blending and mixing a first mixture which is an organic mixture with a second aqueous mixture. For example, a thickener such as Methocell is dispersed in a solvent such as benzyl alcohol, and a clear thick solution is formed. Surfactants, such as Fluorad FC-171 (nonionic) and Triton DF-20 (anionic) may be incorporated into the organic solution. A separate aqueous composition is prepared containing water, the inorganic clay and the organic thickener (or thickeners) such as xanthan gum either alone or in combination with hydroxyalkyl cellulose along with the optional components such as amine activators, corrosion inhibitors, alkalinity agents, dyes, etc. Preferably the inorganic clay and the organic thickener(s) are codispersed in the aqueous emulsion by forming a mixture of the clay and thickener(s) which is then dispersed in the water or the clay and thickener (s) are simultaneously dispersed in the water. If the clay and thickener(s) are not codispersed in the water but added individually, higher viscosity compositions are obtained. The organic mixture then is added to the aqueous mixture with good agitation to form a creamy emulsion.

The following examples illustrate the paint-stripper compositions of the present invention which can be prepared as described above by separately preparing Part A and Part B and thereafter blending the two parts together. Unless otherwise indicated in the specification and appended claims, all parts and percentages are by weight, temperatures and degrees centigrade, and pressures are at or near atmospheric pressure.

|  | Parts/wt. |
|---|---|
| Example I | |
| Part A | |
| Benzyl alcohol | 35.0 |
| Methocell XUS 40443 | 0.3 |
| Part B | |
| Water | 62.9 |
| Veegum - T | 1.5 |
| Xanthan gum | 0.3 |
| Example II | |
| Part A | |
| Benzyl alcohol | 33.460 |
| Fluorad FC171 | 0.003 |
| Methocell XUS 40443 | 0.300 |
| Triton DF-20 | 0.300 |
| Part B | |
| Water | 60.572 |
| Natrosol 250HB | 0.342 |
| Veegum T | 1.246 |
| Xanthan gum | 0.283 |
| Triethanolamine (99%) | 0.303 |
| Sodium hydroxide (50%) | 0.121 |
| Sodium silicate (E-grade) | 1.010 |
| Ammonium hydroxide (28%) | 2.021 |
| Dye | 0.039 |
| Example III | |
| Part A | |
| Benzyl alcohol | 32.49 |
| Fluorad FC-1 71 | 0.003 |
| Methocel XUS 40443 | 0.300 |
| Triton DF-20 | 0.300 |
| Part B | |
| Water | 59.678 |
| Natrosol 250 H4BR | 0.602 |
| Veegum T | 0.350 |
| Xanthan gum | 0.274 |
| Sodium silicate (E-grade) | 1.000 |
| Ammonium hydroxide (28%) | 2.000 |
| Glycerine | 2.000 |
| Mazamide SS10 | 1.000 |
| Dye | 0.003 |
| Example IV | |
| Part A | |
| Benzyl alcohol | 32.49 |
| Fluorad FC-171 | 0.003 |

-continued

|  | Parts/wt. |
|---|---|
| Methocel XUS 40443 | 0.300 |
| Triton DF-20 | 0.300 |
| Part B | |
| Water | 56.728 |
| Natrosol 250 H4BR | 0.602 |
| Veegum T | 0.350 |
| Xanthan gum | 0.274 |
| Sodium silicate (E-grade) | 1.000 |
| Ammonium hydroxide (28%) | 2.000 |
| Glycerine | 2.000 |
| Mazamide SS10 | 1.000 |
| Tolyltriazole | 0.500 |
| Mercaptobenzotriazole | 0.450 |
| Butoxyne 497 | 2.000 |
| Dye | 0.003 |
| Example V | |
| Part A | |
| Benzyl alcohol | 45.0 |
| Methocell 311 | 0.5 |
| Triton DF20 | 0.3 |
| Part B | |
| Water | 48.2 |
| Bentone LT | 1.0 |
| Sodium hydroxide (50%) | 0.2 |
| Fluorad FC-128 (1%) | 3.0 |
| Sodium Silicate (E-grade) | 0.5 |

The process for preparing the paint-stripping compositions is illustrated in more detail with regard to the preparation of the composition of Example IV. A first aqueous mixture (Part A) is prepared by mixing the benzyl alcohol, Fluorad FC-171, Methocel XUS 40443 and Triton DF-20 in the amounts indicated above, and a clear thick solution is formed. A separate aqueous solution (Part B) is prepared by simultaneously adding the Natrosol 250 H4BR, Veegum T and Xanthan gum in the amount specified above to the water with stirring to form a codispersion. After mixing for about five minutes, the remaining ingredients of Part B are added individually with stirring for about 5 minutes between the addition of each ingredient. When all of the components of Part B have been dispersed in the water, the organic mixture Part A is then added to the aqueous mixture Part B with good agitation to form a creamy emulsion. The emulsion of Example IV has a viscosity of between about 9000 to 15,000 centipoise. When formulation similar to Example IV is prepared wherein Natrosol 250, Veegum T and Xanthan gum are added and blended into the water individually, the resulting composition is characterized as having a viscosity in the range of 25,000 to 30,000 centipoise.

The present invention also relates to a method of stripping paint from a surface which comprises (A) contacting the paint with a paint-stripper composition which comprises (A-1) from about 5% to about 90% by weight of at least one organic solvent selected from the group consisting of benzyl alcohol, alkyl-substituted benzyl alcohols, furfuryl alcohol, alkyl-substituted furfuryl alcohols and acetylenic alcohols containing from 3 to about 5 carbon atoms;

(A-2) from about 0.05% to about 5% by weight of at least one inorganic clay thickener;

(A-3) from about 0.05% to about 5% by weight of at least one organic thickener; and (A-4) up to about 94.9% by weight of water;

for a period of time sufficient to reduce the adhesion of the paint to the surface; and (B) removing said paint and paint-stripper composition from said surface.

In the method of the invention, the paint to be removed from a surface is contacted with the paint-stripper compositions for a period of time sufficient to reduce the adhesion of the paint to the surface. Contact may be effected by immersion of the painted surface in a container containing the paint stripper, or the paint stripper can be applied to the painted surface by any technique known in the art such as spraying, brushing, rolling, etc. A reduction of the adhesion to the paint to the surface is generally exhibited by bubbling and lifting of the paint from the surface so that the paint can thereafter be easily removed from the surface. The time required to effect the stripping of the paint will vary depending upon a variety of factors including the nature of the paint, the age of the paint, the surface which is painted, etc. Paints which can be stripped with the stripping composition of the present invention include alkyds, acrylics, polyurethanes, epoxies, epoxy/urethane, etc.

The paint stripping compositions of the invention such as the composition of Example IV containing corrosion inhibitors pass the Sandwich Corrosion, Immersion Corrosion and Hydrogen Embrittlement tests as required, for aerospace applications, such as for example, by McDonnell Douglas and Boeing.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A paint-stripping composition comprising a mixture of
   (A) from about 5% to about 90% by weight of at least one organic solvent selected from the group consisting of benzyl alcohol, alkyl-substituted benzyl alcohols, furfuryl alcohol, alkyl substituted furfuryl alcohols, and acetylenic alcohols containing from 3 to about 5 carbon atoms;
   (B) from about 0.05% to about 5% by weight of at least one inorganic clay thickener;
   (C) from about 0.05% to about 5% by weight of at least one organic thickener; and
   (D) up to about 94.9% by weight of water.

2. The paint-stripping composition of claim 1 wherein the organic solvent (A) is benzyl alcohol or an alkyl substituted benzyl alcohol.

3. The paint-stripping composition of claim 1 wherein the inorganic clay thickener is selected from the group consisting of smectite clay, montmorillonite clay, hectorite clay, and bentonite clay.

4. The paint-stripping composition of claim 1 wherein the inorganic clay thickener is a smectite clay.

5. The paint-stripping composition of claim 1 wherein the inorganic clay thickener is a hydrated magnesium aluminum silicate mineral.

6. The paint-stripping composition of claim 1 comprising at least one organic thickener (C) which is a polysaccharide gum.

7. The paint-stripping composition of claim 6 wherein the polysaccharide gum is a natural gum.

8. The paint-stripping composition of claim 6 wherein the polysaccharide gum is a xanthan gum.

9. A paint-stripping composition of claim 1 wherein the composition contains a mixture of a xanthan gum and at least one other cellulosic gum.

10. The paint-stripping composition of claim 9 wherein the cellulosic gum is a cellulose ether or cellulose ester.

11. The paint-stripping composition of claim 1 also containing at least one surfactant.

12. The paint-stripping composition of claim 11 wherein at least one surfactant is an anionic surfactant.

13. The paint-stripping composition of claim 1 also containing ammonia or at least one organic amine as an activator.

14. The paint-stripping composition of claim 13 wherein the organic amine is an aliphatic amine.

15. The paint-stripping composition of claim 13 wherein the organic amine is an oxyalkylamine, a hydroxylamine, a diamine or mixture thereof.

16. The paint-stripping composition of claim 1 also containing one or more alkalinity agents.

17. The paint-stripping composition of claim 16 wherein the alkalinity agents comprise alkali metal hydroxides, alkoxides, or silicates, or mixtures thereof.

18. The paint-stripping composition of claim 1 also containing one or more metal corrosion inhibitors.

19. A paint-stripping composition comprising a mixture of
  (A) from about 25% to 50% by weight of at least one organic solvent selected from the group consisting of benzyl alcohol or an alkyl-substituted benzyl alcohol containing from 1 to about 4 carbon atoms in the alkyl group;
  (B) from about 0.1% to about 1.5% by weight of a hydrated magnesium aluminum silicate mineral;
  (C) from about 0.1% to about 0.5% by weight of a xanthan gum;
  (D) from about 0.1% to about 1.0% by weight of a cellulose ether or ester; and
  (E) up to about 74.7% by weight of water.

20. The paint-stripping composition of claim 19 wherein the organic solvent (A) is benzyl alcohol.

21. The paint-stripping composition of claim 19 wherein the cellulose ether or ester is a cellulose ether selected from the group consisting of alkyl cellulose and hydroxy alkyl cellulose.

22. The paint-stripping composition of claim 19 also containing at least one surfactant.

23. The paint-stripping composition of claim 19 also containing ammonia or at least one organic aliphatic amine as an activator.

24. The paint-stripping composition of claim 19 also containing one or more alkalinity agents.

25. The paint-stripping composition of claim 19 also containing at least one metal corrosion inhibitor.

26. A method of stripping paint from a surface which comprises
  (A) contacting the paint with a paint-stripper composition which comprises
    (A-1) from about 5% to about 90% by weight of at least one organic solvent selected from the group consisting of benzyl alcohol, alkyl-substituted benzyl alcohols, furfuryl alcohol, alkyl-substituted furfuryl alcohol and acetylenic alcohols containing from 3 to about 5 carbon atoms;
    (A-2) from about 0.05% to about 5% by weight of at least one inorganic clay thickener;
    (A-3) from about 0.05% to about 5% by weight of at least one organic thickener; and
    (A-4) up to about 94.9% by weight of water;
  for a period of time sufficient to reduce the adhesion of the paint to the surface; and
  (B) removing said paint and paint-stripper composition from said surface.

27. The method of claim 26 wherein the organic solvent is benzyl alcohol.

28. The method of claim 26 wherein the paint-stripping composition comprises from about 25% to about 50% by weight of benzyl alcohol.

29. The method of claim 26 wherein the paint-stripping composition comprises at least 40% by weight of water.

30. The method of claim 26 wherein the organic clay thickener is a smectite clay.

31. The method of claim 26 wherein the inorganic clay thickener is a hydrated magnesium aluminum silicate mineral.

32. The method of claim 26 wherein the organic thickener is a polysaccharide gum.

33. The method of claim 26 wherein the organic thickener in the paint-stripping composition is a xanthan gum.

34. The method of claim 26 wherein the paint-stripping composition contains a mixture of a xanthan gum and a cellulose ether or ester.

35. The method of claim 26 wherein the paint-stripping composition also contains at least one surfactant.

36. The method of claim 26 wherein the paint-stripping composition also contains at least one metal corrosion inhibitor.

37. The method of claim 26 wherein the paint-stripping composition also contains ammonia or at least one organic amine as an activator.

* * * * *